(12) United States Patent
Freire et al.

(10) Patent No.: US 7,996,390 B2
(45) Date of Patent: Aug. 9, 2011

(54) METHOD AND SYSTEM FOR CLUSTERING IDENTIFIED FORMS

(75) Inventors: Juliana Freire, Salt Lake City, UT (US); Luciano Barbosa, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 385 days.

(21) Appl. No.: 12/032,331

(22) Filed: Feb. 15, 2008

(65) Prior Publication Data
US 2009/0210406 A1 Aug. 20, 2009

(51) Int. Cl.
*G06F 7/00* (2006.01)
*G06F 17/30* (2006.01)

(52) U.S. Cl. ........ 707/722; 707/723; 707/728; 707/736; 707/737; 707/758

(58) Field of Classification Search .................. 707/705, 707/720–735, 999.1, 999.3, 999.6, 999.7, 707/736, 737, 758
See application file for complete search history.

(56) References Cited

U.S. PATENT DOCUMENTS

| | | | |
|---|---|---|---|
| 6,754,873 B1 | 6/2004 | Law et al. | |
| 7,080,073 B1 | 7/2006 | Jiang et al. | |
| 7,213,198 B1 | 5/2007 | Harik | |
| 2002/0169770 A1* | 11/2002 | Kim et al. | 707/5 |
| 2003/0220912 A1* | 11/2003 | Fain et al. | 707/3 |
| 2005/0097436 A1* | 5/2005 | Kawatani | 715/500 |
| 2005/0203924 A1* | 9/2005 | Rosenberg | 707/100 |
| 2006/0129446 A1 | 6/2006 | Ruhl et al. | |
| 2006/0200478 A1 | 9/2006 | Pasztor | |
| 2006/0230033 A1* | 10/2006 | Halevy et al. | 707/3 |
| 2007/0100812 A1 | 5/2007 | Simske et al. | |
| 2007/0100862 A1 | 5/2007 | Reddy et al. | |
| 2007/0112898 A1* | 5/2007 | Evans et al. | 707/205 |
| 2008/0154942 A1* | 6/2008 | Tsai et al. | 707/102 |

OTHER PUBLICATIONS

Huang et al., "Multi-type Features Based Web Document Clustering", Springer Berlin / Heidelberg, vol. 3306/2004, pp. 253-265, 2004. Download: http://www.springerlink.com/content/te7qn81416wqy7g6/.*

Barbosa et al., "Searching for Hidden-Web Database", Eighth International Workshop on the Web and Database, Jun. 16-17, 2005, pp. 1-6. Download: http://webdb2005.uhasselt.be/papers/1-1.pdf.*

(Continued)

*Primary Examiner* — John E Breene
*Assistant Examiner* — Hares Jami
(74) *Attorney, Agent, or Firm* — Bell & Manning, LLC

(57) ABSTRACT

A method is provided for organizing a plurality of documents that include forms. An initial set of clusters is defined for the plurality of documents. The initial set of clusters is reclustered based on similarity values calculated in multiple feature spaces. For example, a first feature space may be associated with a content of a document while a second feature space may be associated with a content of a form associated with the document. Each cluster has an associated centroid vector in each feature space that is used to represent the cluster. The similarity between the document and each cluster is calculated in both feature spaces. Each document is assigned to the cluster whose centroid is most similar. The cluster centroids may be recalculated and the process repeated until the cluster assignments become stable.

32 Claims, 10 Drawing Sheets

OTHER PUBLICATIONS

De Lucia et al., "Using a Competitive Clustering Algorithm to Comprehend Web Applications", IEEE, 2006, pp. 1-8. Download: http://ieeexplore.ieee.org/stamp/stamp.jsp?tp=&arnumber=4027204.*

Barbosa et al., "An Adaptive Crawler for Locating Hidden-Web Entry Points," in Proceedings of the 16th International World Wide Web Conference (WWW), Banff, Alberta, Canada, May 8-12, 2007, 10 pages.

Barbosa et al., "Combining Classifiers to Identify Online Databases," in Proceedings of the 16th International World Wide Web Conference (WWW), Banff, Alberta, Canada, May 8-12, 2007, 9 pages.

Barbosa et al., "Organizing Hidden-Web Databases by Clustering Visible Web Documents," in Proceedings of the IEEE 23rd International Conference on Data Engineering (ICDE), Istanbul, Apr. 14, 2007, 10 pages.

Barbosa et al., "Automatically Constructing a Directory of Molecular Biology Databases," in Proceedings of the International Workshop on Data Integration in the Life Sciences 2007 (DILS), Philadelphia, Jun. 27, 2007, 10 pages.

Barbosa et al., "Searching for Hidden-Web Databases," in Proceedings of the 8th ACM SIGMOD International Workshop on Web and Databases (WebDB), Baltimore, Maryland, Jun. 16-17, 2005, 6 pages.

Barbosa et al., "Siphoning Hidden-Web Data through Keyword-Based Interfaces," in Proceedings Of the 19th Brazilian Symposium on Databases (SBBD), Brasilia, Oct. 18, 2004, 13 pages.

Barbosa et al., "Automatically Constructing Collections of Online Databases," The ACM 15th Conference on Information and Knowledge Management, Arlington, Virginia, pp. 796-797, Nov. 5, 2006.

* cited by examiner

METHOD AND SYSTEM FOR CLUSTERING IDENTIFIED FORMS

REFERENCE TO GOVERNMENT RIGHTS

This invention was made with United States government support awarded by the following agencies: National Science Foundation, Information and Intelligent Systems Division, Award Nos. 0534628, 0513692, and 0713637. The United States government has certain rights in this invention.

FIELD

The field of the disclosure relates generally to locating relevant content among a plurality of documents. More specifically, the disclosure relates to clustering documents.

BACKGROUND

The number of online databases and services has been growing at a rapid pace. These are typically accessed through Web forms filled out by users, and content is returned on demand, upon form submission. This content can reside in databases or can be generated by an application. Such sites are collectively called 'hidden web sites' As the volume of hidden information grows, there has been increased interest in techniques that allow users and applications to leverage this information. Applications that attempt to make hidden-Web information more easily accessible include metasearchers, hidden-Web crawlers, online-database directories, and Web information integration systems. Because for any given domain of interest, there are many hidden-Web sources whose data need to be integrated or searched, an important requirement for these applications is the ability to locate the hidden web sources. However, doing so is a challenging problem given the scale and the dynamic nature of the Web. Thus, it is important to include the ability to automatically discover forms that serve as entry points to the hidden-Web databases and Web applications.

Forms are very sparsely distributed over the Web even within a well-defined domain. To efficiently maintain an up-to-date collection of hidden-Web sources, a crawling strategy should perform a broad search while simultaneously avoiding visiting unproductive regions of the Web. The crawler must also produce high-quality results. Having a homogeneous set of forms in the same domain is useful, and sometimes required, for a number of applications. For example, the effectiveness of form integration techniques can be greatly diminished if the set of input forms is noisy and contains forms that are not in the integration domain. However, an automated crawling process invariably retrieves a diverse set of forms. For example, a focus topic may encompass pages that contain searchable forms from many different database domains. For example, while crawling to find "airfare." search interfaces a crawler is likely to retrieve a large number of forms in different domains, such as "rental cars" and "hotels", because these are often co-located with "airfare" search interfaces in travel sites. The set of retrieved forms also includes many non-searchable forms that do not represent database queries such as forms for login, mailing list subscriptions, quote requests, and Web-based email forms.

Given a set of heterogeneous forms, it is also beneficial to group together forms that correspond to similar databases or Web services provided by Web applications, so that people and applications can more easily find the correct databases/services and consequently, the hidden information they are seeking on the Web. There are several challenges in organizing these forms. Notably, a scalable solution must be able to automatically parse, process and group form interfaces that are designed primarily for human consumption. In addition, because there is a very wide variation in the way Web-site designers model aspects of a given domain, it is not possible to assume certain standard form field names and structures. Even in simple domains such as job search, the heterogeneity in forms is amazing. Different terms may be used to represent the same attributes. For example, in a first form related to a job search topic, two fields are named "Job Category" and "State", whereas in a second form related to the job search topic two fields are named "Industry" and "Location" to represent the same concepts. Simple search interfaces often have a single attribute with generic labels such as "Search", while others have no labels. For example, a text field of a form may have no associated label between the "FORM" tags though the label "Search Jobs" appears above the text field in a hypertext markup language (HTML) subtree which lies outside. There are also forms that do not contain any parseable attribute names. GIF images are used instead. Thus, what is needed is a method and a system for identifying relevant content including forms used to access content on a network such as the Internet and/or for clustering the identified relevant content.

SUMMARY

In an exemplary embodiment, a method of organizing a plurality of documents that include forms is provided. A first form in a first document selected from a plurality of documents is identified. A first similarity value is calculated in a first feature space between a first cluster selected from a plurality of clusters defined for the plurality of documents and the first document. The first feature space is associated with a content of the first document and a content of a document assigned to the first cluster. A second similarity value is calculated in a second feature space between the first cluster and the first document. The second feature space associated with a content of the identified first form and a content of a form in the document assigned to the first cluster. A similarity value is calculated between the first document and the first cluster based on the calculated first similarity value and the calculated second similarity value. The process is repeated with each of the plurality of clusters as the first cluster selected from the plurality of clusters. A cluster of the plurality of clusters to which to assign the first document is determined based on the calculated similarity value for each of the plurality of clusters.

In another exemplary embodiment, a computer-readable medium is provided comprising computer-readable instructions that, upon execution by a processor, cause the processor to perform the operations of the method of organizing a plurality of documents that include forms.

In yet another exemplary embodiment, a device for organizing a plurality of documents that include forms is provided. The device includes, but is not limited to, a processor and a computer-readable medium operably coupled to the processor comprising instructions that, upon execution by the processor, perform the operations of the method of organizing a plurality of documents that include forms.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
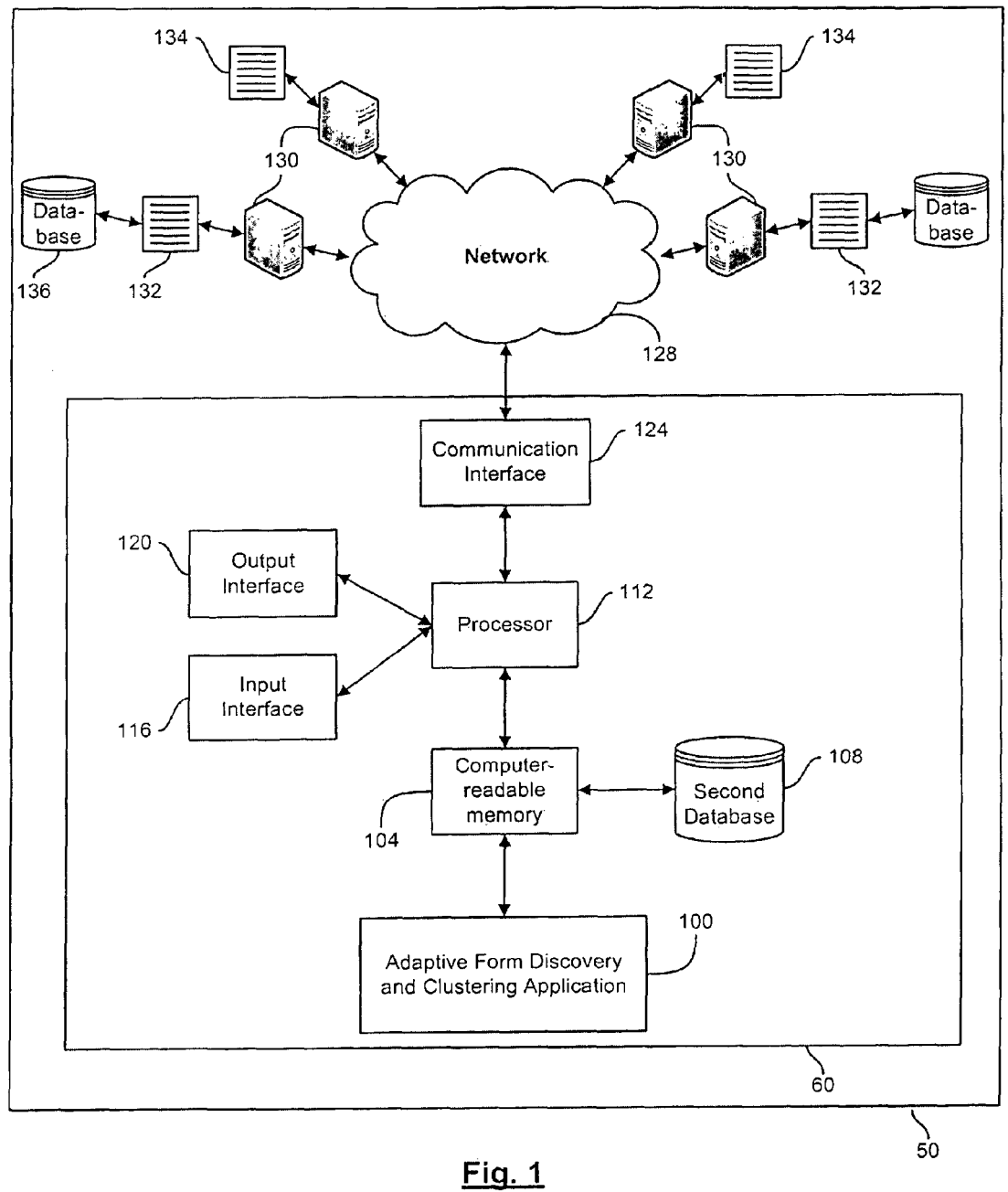
FIG. 1 depicts a block diagram of an adaptive form discovery and clustering system in accordance with an exemplary embodiment.

FIG. 1 depicts a block diagram of an adaptive form discovery and clustering system 50 in accordance with an exemplary embodiment. Adaptive form discovery and clustering system 50 may include a computing device 60 that communicates through a network 128 with a plurality of server devices 130. The plurality of server devices 130 provide access to a form document 132 and/or a non-form document 134. In an exemplary embodiment, form document 132 and non-form document 134 are web pages, and a web server application is hosted at the plurality of server devices 130. Through interaction with the web server application, form document 132 and/or non-form document 134 may be accessed from computing device 60. The web server application may control the display of form document 132 and/or non-form document 134 that present information to a user and from which the user may make selections and enter information.

A web page may contain hyperlinks or links to other web pages with related or additional information. Each web page is identified by a uniform resource locator (URL) that includes the location or address of the computer that contains the document to be accessed in addition to the location of the document on that computer. The type of document, or resource, may depend on the Internet application protocol. For example, the hypertext transfer protocol (HTTP) may describe a web page or document accessed with a browser application.

Form document 132 provides access to a database and/or web application 136. As used herein, a document that provides access to a database and/or web application is termed a "form." A non-form document 134 does not provide access to a database or web application and is thus, not a form. A server device may provide access to a plurality of form documents and/or a plurality of non-form documents. Form document 132 may provide access to a plurality of databases and/or web applications 136. Additionally, database/web application 136 may be accessed from a plurality of form documents. Form document 132, non-form document 134, and/or database/web application 136 may be stored on server device 130 or on another device.

Adaptive form discovery and clustering system 50 may include fewer or additional networks. For example, adaptive form discovery and clustering system 50 may not include network 128 such that form document 132, non-form document 134, and/or database 136 are hosted at computing device 60. Server device 130 includes or can access database 136 either through a direct connection or through a second network. Network 128 may be a local area network, a wide; area, network, a cellular network, etc. In an exemplary embodiment, network 128 is the Internet.

Computing device 60 may include, but is not limited to, an adaptive form discovery and clustering application 100, a non-transitory computer-readable medium 104, a second database 108, a processor 112, an input interface 116, an output interface 120, and a communication interface 124. Computing device 60 may include a computer of any form factor such as a laptop, a desktop, an integrated messaging device, a personal digital assistant, a cellular telephone, an IPod, etc. Elements of computing device 60 may be hosted in a single computer or may be distributed across multiple computers positioned in a single location and/or remote from one another. In adaptive form discovery and clustering system 50, computing device 60 sends and receives signals through network 128 to/from server device 130 using communication interface 124. Adaptive form discovery and clustering system 50 may include additional types of devices.

Computer-readable medium 104 is an electronic holding place or storage for information so that the information can be accessed by processor 112 as known to those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Computing device 60 may have one or more computer-readable media that use the same or a different memory media technology. Computing device 60 also may have one or more drives that support the loading of a memory media such as a CD or DVD.

Second database 108 is a method for storing data as known to those skilled in the art. Second database 108 may be organized into multiple databases to improve data management and access. Second database 108 is a data repository for computing device 60. Second database 108 may utilize various database technologies and a variety of different formats as known to those skilled in the art including a file system, a relational database and/or a system of tables, etc.

Processor 112 executes instructions as known to those skilled in the art. The instructions may be carried out by a special purpose computer, logic circuits, or hardware circuits. Thus, processor 112 may be implemented in hardware, firmware, software, or any combination of these. The term "execution" is the process of running an application or the carrying out of the operation called for by an instruction. The instructions may be written using one or more programming language, scripting language, assembly language, etc. Processor 112 executes an instruction, meaning that it performs the operations called for by that instruction. Processor 112 operably couples with input interface 116, output interface 120, computer-readable medium 104, and communication interface 124 to receive, to send, and to process information. Processor 112 may retrieve a set of instructions from a permanent memory device and copy the instructions in an executable form to a temporary memory device that is generally some form of RAM. Computing device 60 may include a plurality of processors that use the same or a different processing technology.

Input interface 116 provides an interface for receiving information from the user for entry into computing device 60 as known to those skilled in the art. Input interface 116 may use various input technologies including, but not limited to, a keyboard, a pen and touch screen, a mouse, a track ball, a touch screen, a keypad, one or more buttons, etc. to allow the user to enter information into computing device 60. Input interface 116 may provide both an input and an output interface. For example, a touch screen both allows user input and presents output to the user.

Output interface 120 captures and/or presents information to a user of computing device 60 as known to those skilled in the art. For example, output interface 120 may be a display or a printer. Exemplary displays include thin film transistor displays, light emitting diode displays, and liquid crystal displays. Exemplary printers include laser printers, inkjet printers, dot matrix printers, plotters, and thermal printers.

Communication interface 124 provides an interface for receiving and transmitting data between devices using various protocols, transmission technologies, and media as known to those skilled in the art. Communication interface 124 may support communication using various transmission media that may be wired or wireless. Computing device 60 may have one or more communication interfaces that use the same or different protocols, transmission technologies, and media.

Adaptive form discovery and clustering application 100 performs operations associated with identifying forms that provide access to a database/web application, and/or with clustering the identified forms. The operations may be implemented using hardware, firmware, software, or a combination of these. With reference to the exemplary embodiment shown in FIG. 1, adaptive form discovery and clustering application 100 is implemented in software stored in computer-readable medium 104 and accessible by processor 112, which executes the instructions that embody the corresponding operations. Adaptive form discovery and clustering application 100 may be written using one or more programming languages, assembly languages, scripting languages, etc. In an exemplary embodiment, adaptive form discovery and clustering application 100 may perform operations associated with identifying forms that provide access to a database/web application without performing operations associated with clustering forms. In another exemplary embodiment, adaptive form discovery and clustering application 100 may perform operations associated with clustering documents without performing operations associated with identifying forms that provide, access to a database/web application.

Figure 2:
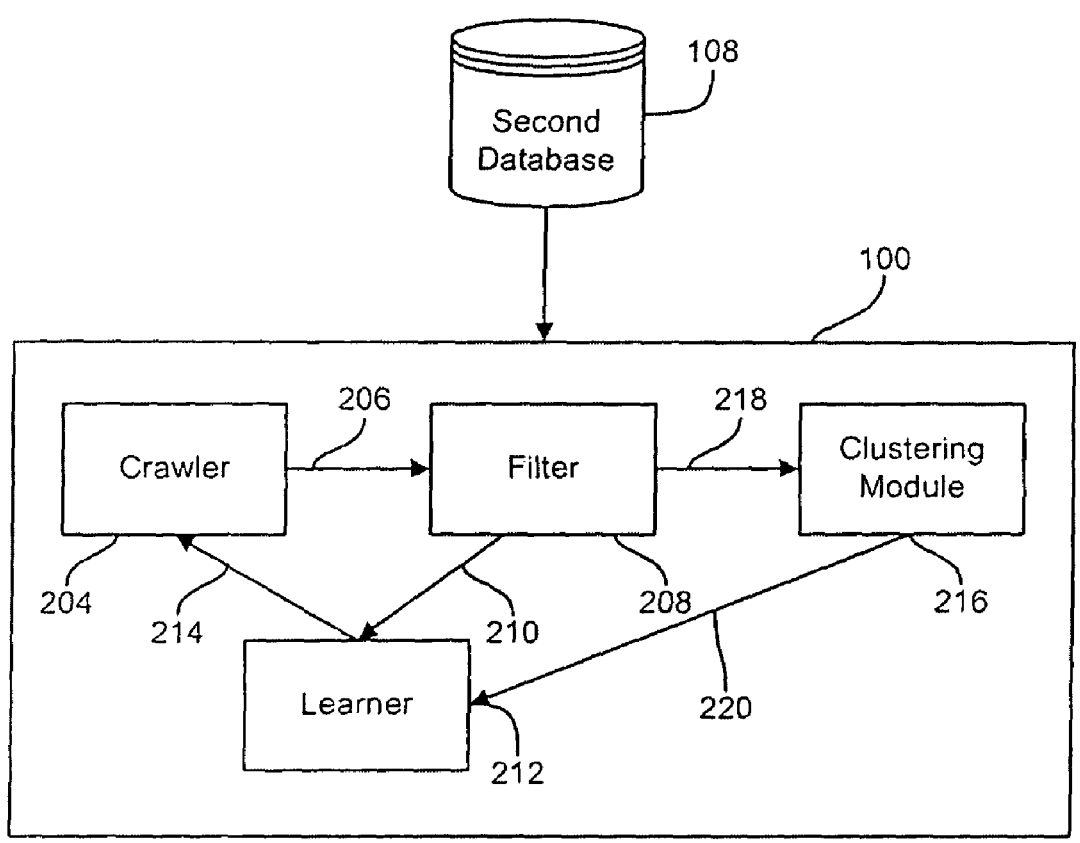
FIG. 2 depicts a block diagram of an adaptive form discovery and clustering application in accordance with an exemplary embodiment.

With reference to FIG. 2, adaptive form discovery and clustering application 100 may include a crawler module 204, a filter module 208, a clustering module 216, and a learner module 212. Adaptive form discovery and clustering application 100 need not include one or more of the modules 204, 208, 212, 216 depending on the embodiment. Data is communicated between crawler module 204, filter module 208, clustering module 216, and learner module 212. One or more of crawler module 204, filter module 208, clustering module 216, and learner module 212 may interact through communication interface 124 using network 128. Thus, the components of adaptive form discovery and clustering application 100 may be implemented in a single executable, in a single computing device, or in a plurality of computing devices which are located in a single location or in a single facility, and/or which may be remote from one another. Data is communicated between modules using a data interface. Data is communicated between crawler 204 and filter 208 using a first data interface 206. Data is communicated between filter 208 and learner 212 using a second data interface 210. Data is communicated between filter 208 and clustering process 216 using a third data interface 218. Data is communicated between learner 212 and crawler 204 using a fourth data interface 214. Data is communicated between clustering process 216 and learner 212 using a fifth data interface 220.

Adaptive form discovery and clustering application 100 may access a document graph stored in second database 108. The document graph includes a plurality of documents and links. The documents may contain information including text, images, audio, and video, as well as links to other documents. For example, the World-Wide Web (Web) is a document graph, which includes webpages (documents) which contain links to other webpages that may be unidirectional or bidirectional. Some of the documents may be forms. Alternatively or additionally, adaptive form discovery and clustering application 100 may access the plurality of server devices 130 using network 128 to locate form document 132 and/or non-form document 134 and to identify form document 132 as a document containing a form providing access to database 136.

With reference to FIGS. 7-12, exemplary operations associated with adaptive form discovery and clustering application 100 are described. Additional, fewer, or different operations may be performed, depending on the embodiment. The order of presentation of the operations is also not intended to be limiting. In an operation 704, an initial set of crawl candidates is obtained. A crawl candidate includes a link to a subset of documents in a universe being crawled. For example, the universe may be the Web. The initial set of crawl candidates may be selected manually by a user of computing device 60, may be identified by analysis of one or more preexisting directories of relevant topics, may be randomly selected from a set of links, or obtained using other methods as known to those skilled in the art. An evaluation score may be associated with a crawl candidate. The evaluation score may represent an estimate of the usefulness of crawling to, or accessing the document associated with the link. The initial set of crawl candidates and evaluations scores may be stored in second database 108. The initial set of crawl candidates may be ranked or otherwise ordered based on the evaluation scores.

In an operation 708, a crawl candidate is selected from the initial set of crawl candidates and the document to which the selected crawl candidate points is accessed. In an operation 712, a relevance of the accessed document is evaluated. The evaluation may include estimating a likelihood that the accessed document is relevant to the topic of the crawl. The evaluation may be performed using a form type classifier. In an exemplary embodiment, the form type classifier is a naïve Bayesian model of a probability that a document is relevant to the object of the crawl based on the words the document contains. Other types of form type classifiers may be used to perform the evaluation as known to those skilled in the art. The form type classifier may automatically learn from training examples of relevant documents provided by the user, may automatically learn from the results of prior crawls, or may be obtained using other methods. The form type classifier may be periodically adapted as the crawl progresses.

In an operation 716, whether or not the accessed document is relevant is determined based on the results of the evaluation. The determination may be performed, for example, by comparing a value representing a result of the evaluation with a preset threshold. If the accessed document is determined not to be relevant, processing continues at operation 708.

If the accessed document is determined to be relevant, any links contained in the accessed document are extracted in an operation 720. In an operation 724, the extracted links are evaluated to determine an evaluation score which is an estimate of an expected value in following the link. The evaluation may be performed using a link classifier. In an exemplary embodiment, the link classifier is a naïve Bayesian model of a probability that a link points either directly or indirectly to a relevant document based on the content of a link (i.e., anchor and URL) as well as text in the vicinity of a link. For example, the link classifier may be a finite set of naïve Bayesian models with the first representing the probability that the link points directly to a relevant document; the second representing the probability that the link points to a relevant document that is one link away from a document accessed through the link; the third representing the probability that the link points to a relevant document that is two links away from a document accessed through the link, and so on. The format of the accessed document may allow text to be associated with the link and/or may represent the links using a meaningful alphanumeric form that may be used by the link classifier to evaluate the link. Link classifiers other than naïve Bayesian models may be used to determine an evaluation score as known to a person of skill in the art. In an operation 728, the links are added to the set of crawl candidates, and the evaluation scores are used to update or re-rank the set of crawl candidates. Links with an evaluation score below a specified threshold may not be added to the set of crawl candidates.

In an operation 732, the accessed document is analyzed to determine if the accessed document contains a form or not. In an exemplary embodiment, a classification algorithm, such as a decision-tree classifier, a support-vector machine, a naïve Bayes classifier, or a backpropagation-trained neural network classifiers is executed to classify the accessed document based on features extracted from the accessed document. The features used may vary and may depend on the format of the accessed document. If the accessed document is a webpage, for example, the features may be derived from a structure of the accessed document and/or from a portion of the content of the accessed document. An embodiment using only structural features may be domain-independent, and thus, separate potentially relevant forms from irrelevant forms regardless of the object (topic) of the crawl. Structural features of forms that may be analyzed as part of the evaluation include: a number of hidden tags; a number of checkboxes; a number of radio tags; a number of file inputs; a number of submit tags; a number of image inputs; a number of buttons; a number of resets; a number of password tags; a number of textboxes; a number of select lists; a number of items in each select list; a number of characters in textboxes; a submission method used such as a post or a get method; etc. Content features of webpages include the presence or absence of certain words in the accessed document, or in certain parts of the accessed document. For example, the presence of the string "submit" within a form tag in the document may be used to indicate that the form is used to submit information instead of retrieve information.

If it is determined that the accessed document does not contain a potentially relevant form, processing continues at operation 708. If it is determined that the accessed document contains a potentially relevant form, processing continues with an operation 736. In operation 736, a subject matter of the accessed document is evaluated to determine relevance to a topic of interest or the object of the crawl. In an exemplary embodiment, the evaluation includes a text classification process, which classifies the form into one of the classes "relevant" or "irrelevant" based on features drawn from the content of the form. The text classification process may include pre-processing the form to remove unnecessary structure and formatting, such as the hypertext markup language (HTML) markup in a webpage document. The text classification process also may include stemming the remaining words and determining a frequency with which the stemmed words appear in the form. The text classification process also may include executing a text classification algorithm using the determined word, frequency pairs to classify the form as relevant or irrelevant. As known to those skilled in the art, text classification algorithms include decision-tree classifiers, support-vector machines, naïve Bayes classifiers, backpropagation-trained neural network classifiers, etc. The text classification process generally is domain-specific such that different topics of interest may be analyzed using different feature sets and/or classifiers.

If the accessed form is determined to be irrelevant for the topic of the crawl, processing continues at operation 708. If the accessed form is determined to be relevant, processing continues in an operation 740. In operation 740, the accessed form is identified as a relevant form, and the identification of the accessed document is output. The identification of the accessed document as a relevant form may be output by printing information associated with the identification, displaying information associated with the identification, storing information associated with the identification such as storing a link to the accessed document or the accessed document in computer-readable medium 104 or second database 108. The stored information may be accessed by another application. Other output methods may be used as known to a person of skill in the art.

In an exemplary embodiment, the document and/or link classifiers are adapted dynamically as the crawl progresses. In an operation 744, an adaptation condition is tested to determine if adaptation of the document and/or link classifiers is appropriate. The adaptation condition may be, for example, when a predetermined number of relevant forms have been identified since the last adaptation of the document and/or link classifiers. As another example, the adaptation condition may be when a predetermined number of documents have been visited since the last adaptation of the document and/or link classifiers. Other adaptation conditions may also be used, as known to those skilled in the art.

If the adaptation condition is not satisfied, processing continues at operation 708. If the adaptation condition is satisfied, processing continues with an operation 748. In operation 748, a set of documents and links used to adapt the document and link classifiers is obtained. In an exemplary embodiment, the set of documents includes the relevant forms identified since the last adaptation, in combination with documents and links associated with the paths that led the crawler to the documents identified to contain relevant forms. In an exemplary embodiment, documents and links more than a certain distance from the identified relevant forms are not included in the set. In other embodiments, the documents used are the new relevant forms, together with documents that are within a certain number of links of the new relevant forms. The links used are those on the connecting paths. A backward crawl may be performed from the relevant forms to identify the documents and links used.

In operation 754, the link classifier is updated. For example, with reference to FIG. 9, exemplary operations associated with updating the link classifier are described. Additional, fewer, or different operations may be performed, depending on the embodiment. The order of presentation of the operations is not intended to be limiting. In an operation 904, the relevant forms identified since the last link classifier update are obtained and a document is selected. In an operation 908, a set of paths is identified to the selected document, together with the documents associated with the set of paths. The set of paths may be the path that the crawler took to reach the form and/or a plurality of paths associated with reaching the relevant form, possibly obtained by a backward crawl beginning at the relevant form. In an operation 912, a determination is made concerning whether or not any new relevant forms remain to be processed. If a relevant form remains to be processed, processing continues at operation 908 with a next document selected from the relevant forms identified since the last form type classifier update. If all of the relevant forms have been processed, processing continues at an operation 916.

In operation 916, features are automatically selected for the link classifier from the identified paths. For example, with reference to FIG. 10, exemplary operations associated with selecting features to update the link classifier are described. Additional, fewer, or different operations may be performed, depending on the embodiment. The order of presentation of the operations is not intended to be limiting. In an operation 1004, a path length d of interest is identified. A path length d defines the distance between a link and a relevant document identified previously as part of the crawl process or as part of a set of documents stored in second data base 108. In an operation 1006, a set of documents at the selected distance d from the identified relevant forms is obtained. In an operation 1008, a feature space of interest is identified. A feature space is associated with a subset of the information in the document that contains the link, and may be selected differently in different embodiments. The selection may depend on the format of the document that contains the link. For example, if the document is a webpage, feature spaces of interest may include: words in the anchor text of the link, words that appear in the document near the link, and/or the text of the link URL. The selected features are used to identify documents and links that are expected to be d steps from a relevant form.

In an operation 1012, features are extracted based on the identified feature space to model links at a distance d from a relevant form. The features may be selected in a variety of ways depending on the nature of the link classifier. For example, if the documents are web pages and the feature space of interest includes the anchor text, one or more terms in the anchor text are extracted as features. If the documents are web pages and the feature space of interest includes the words that appear in the document near the link, a fixed number of words nearest the link may be extracted. If the documents are web pages and the feature space of interest includes the text of the link URL, the text of the link URL can be extracted and analyzed. For example, given the following URLs: http://www.site1.com/bookpool; http://www.book-.com/book; and http://www.site2.com/bookexpress, using a regular tokenization approach, as may be used for other feature spaces such as anchor text, removing the words 'www' and 'com', results in the following table.

| Word | Frequency |
| --- | --- |
| site1 | 1 |
| site2 | 1 |
| bookpool | 1 |
| book | 2 |
| bookexpress | 1 |

In this example, 'book' is a prefix in the words 'bookpool' and 'bookexpress'. In an exemplary embodiment, the frequencies of these two words can be collapsed in the word 'book'. The words can be ordered in terms of frequency, and the list scanned from the top to the bottom for words that have the higher ranking words as substrings. In this example, the top word in the list, 'book', is selected and words that have 'book' as a substring are identified and their frequency added to 'book'. Thus, the final list of features may be:

| Word | Frequency |
| --- | --- |
| book | 4 |
| site1 | 1 |
| site2 | 1 |
| bookpool | 1 |
| bookexpress | 1 |

In an operation 1014, the extracted features are processed. For example, the terms may be stemmed and stop words removed. In an operation 1016, the processed features are ranked. For example, the processed features may be ranked based on their frequency of occurrence in the documents. Other ranking methods can be used, such as those related to information gain or a chi-square metric, as known to a person of skill in the art.

In an operation 1020, a predetermined number of the highest ranked features are identified. In an operation 1024, a determination is made concerning whether or not an additional feature space of interest is to be processed. If an additional feature space of interest is to be processed, processing continues at operation 1008. If there is no additional feature space of interest to be processed, processing continues at an operation 1028. In operation 1028, a determination is made concerning whether or not additional distances d of interest are to be processed. If additional distances d of interest are to be processed, processing continues at operation 1004. If there are no additional distances d of interest to be processed, processing continues at an operation 920 of FIG. 9.

Figure 9:
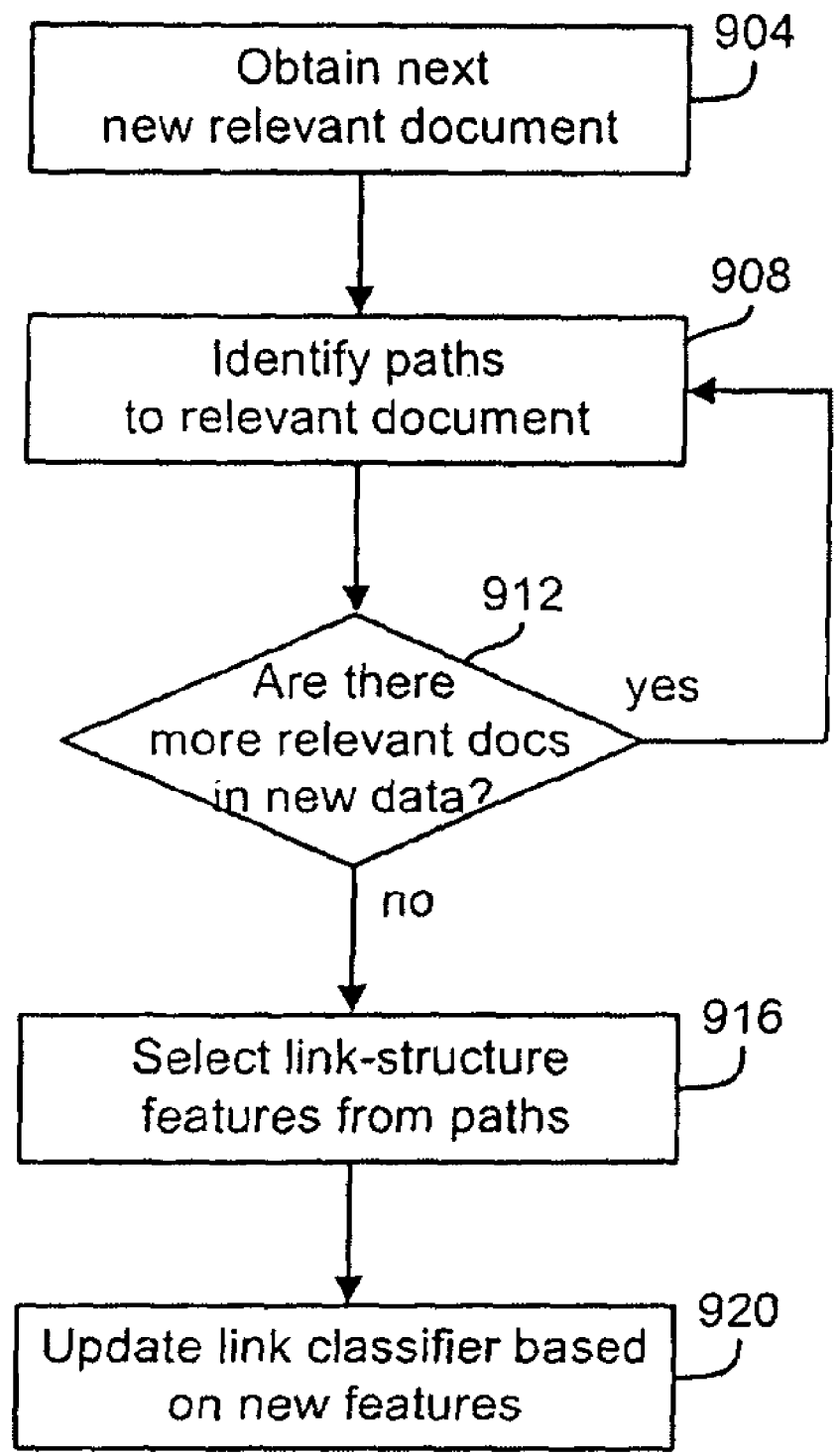
FIG. 9 depicts a flow diagram illustrating exemplary operations performed in adapting a link classifier.
Figure 10:
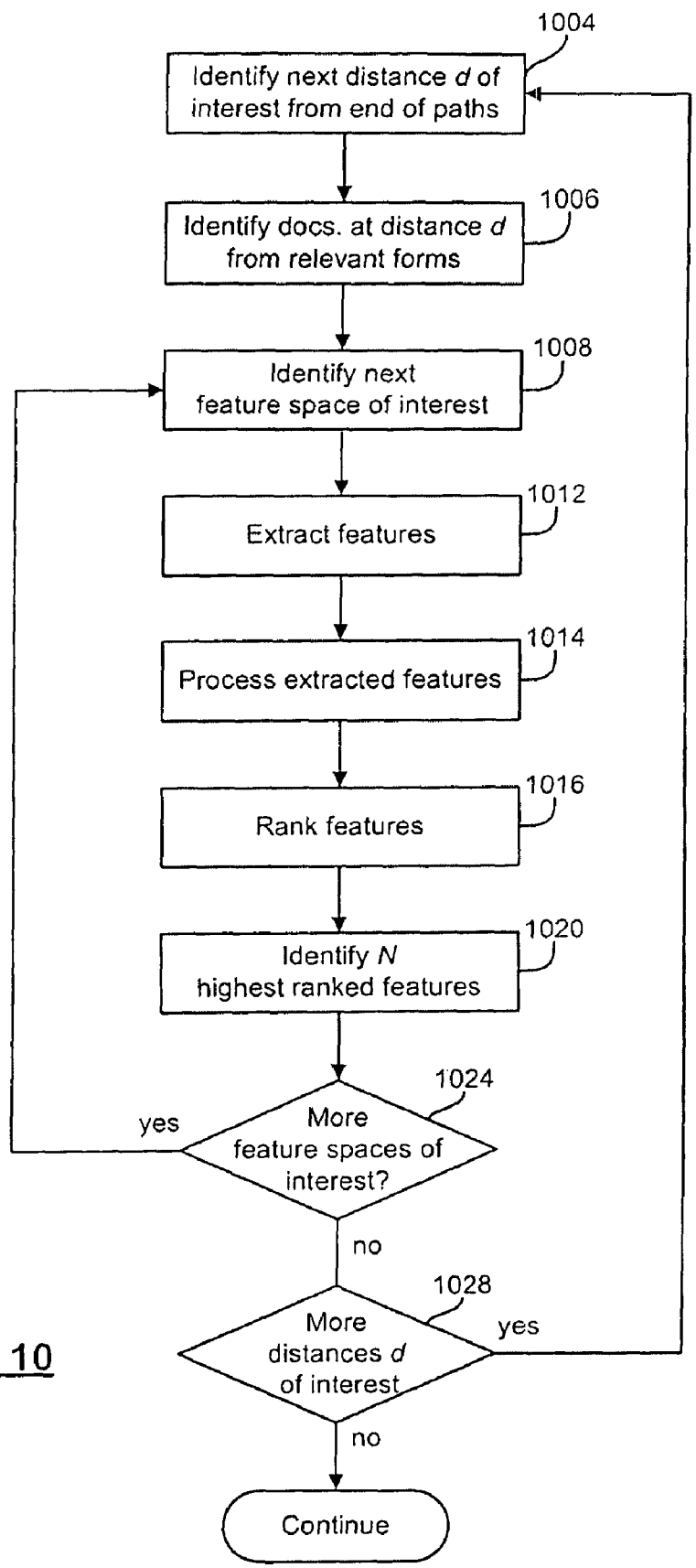
FIG. 10 depicts a flow diagram illustrating exemplary operations performed in extracting features from a set of paths for the link classifier.
Figure 11:
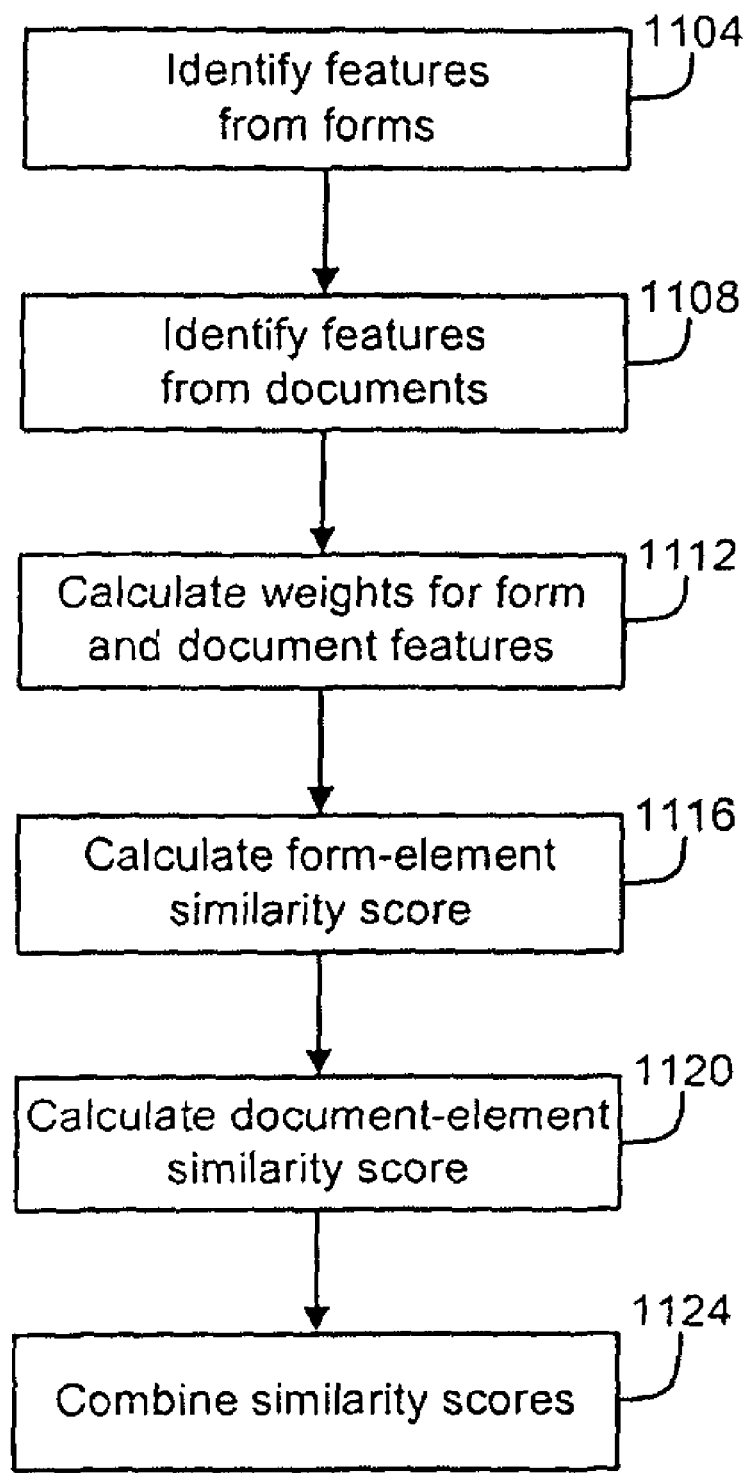
FIG. 11 depicts a flow diagram illustrating exemplary operations performed in calculating a similarity metric.
Figure 12:
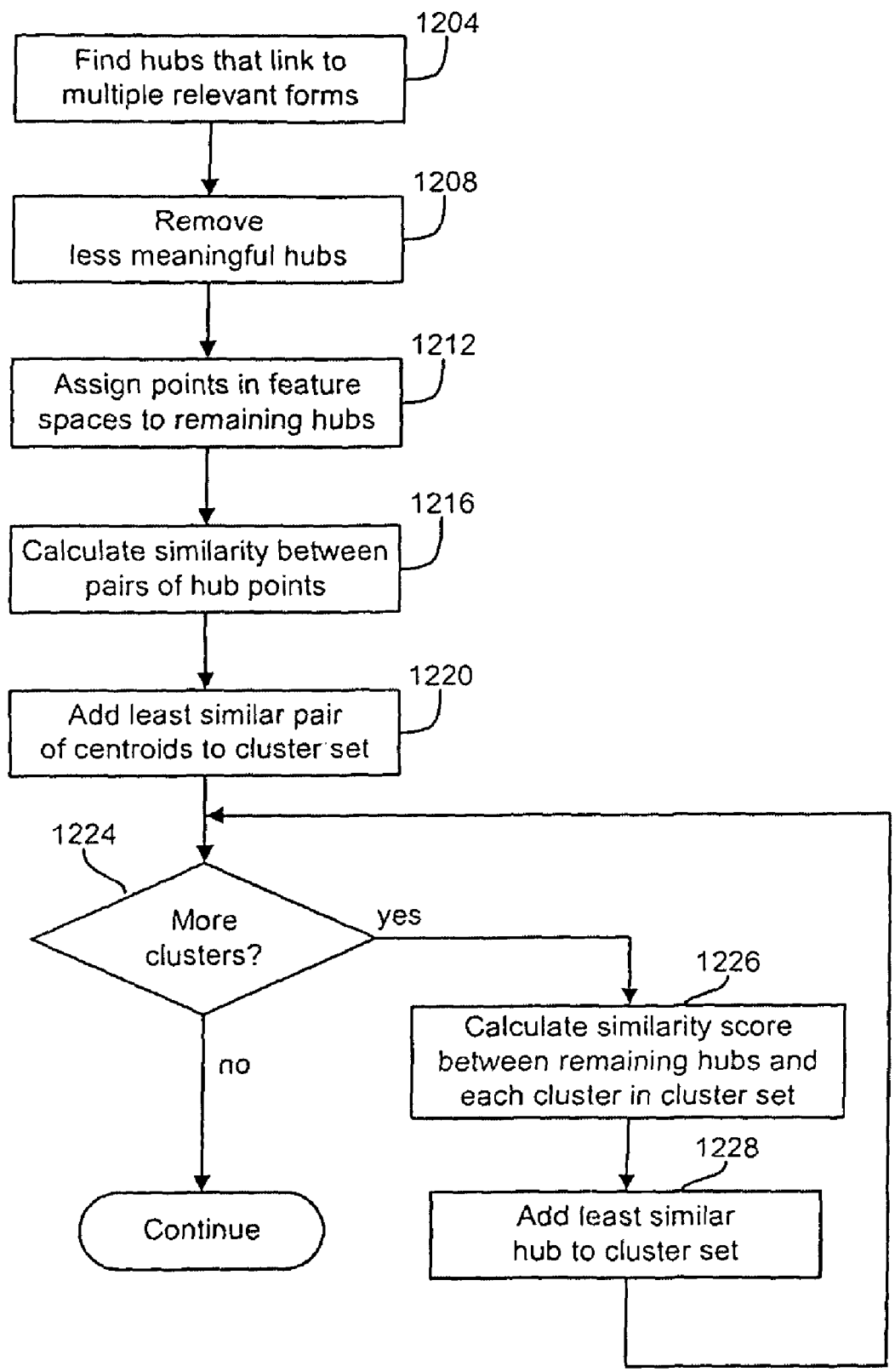
FIG. 12 depicts a flow diagram illustrating exemplary operations performed in identifying an initial set of clusters.

With continuing reference to FIG. 9, in an operation 920, the link classifier is updated based on the selected features for each distance d of interest. The link classifier may be updated incrementally or recalculated entirely.

Figure 7:
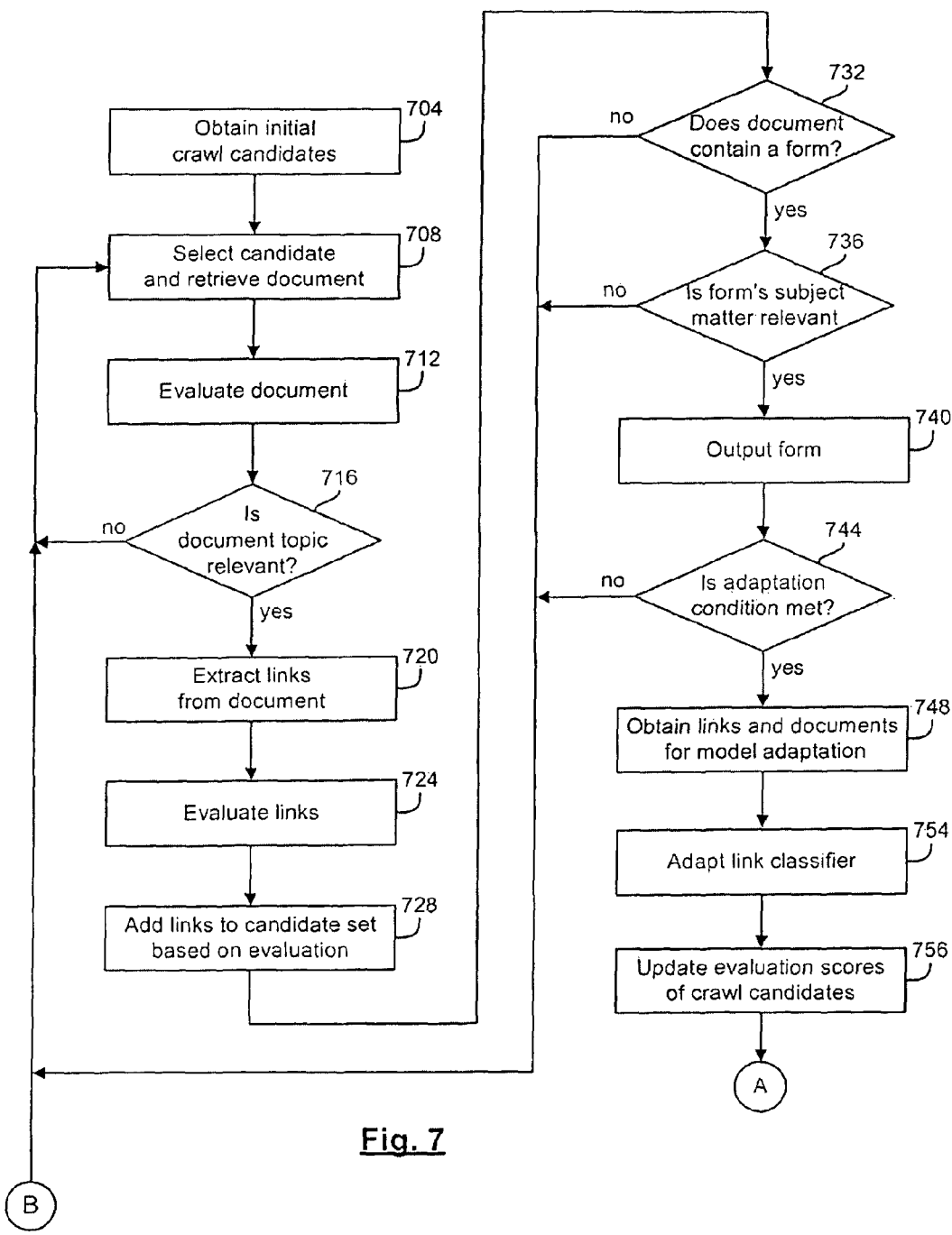
FIGS. 7 and 8 depict a flow diagram illustrating exemplary operations performed by the adaptive form discovery and clustering application of FIG. 2 in accordance with an exemplary embodiment.
Figure 8:
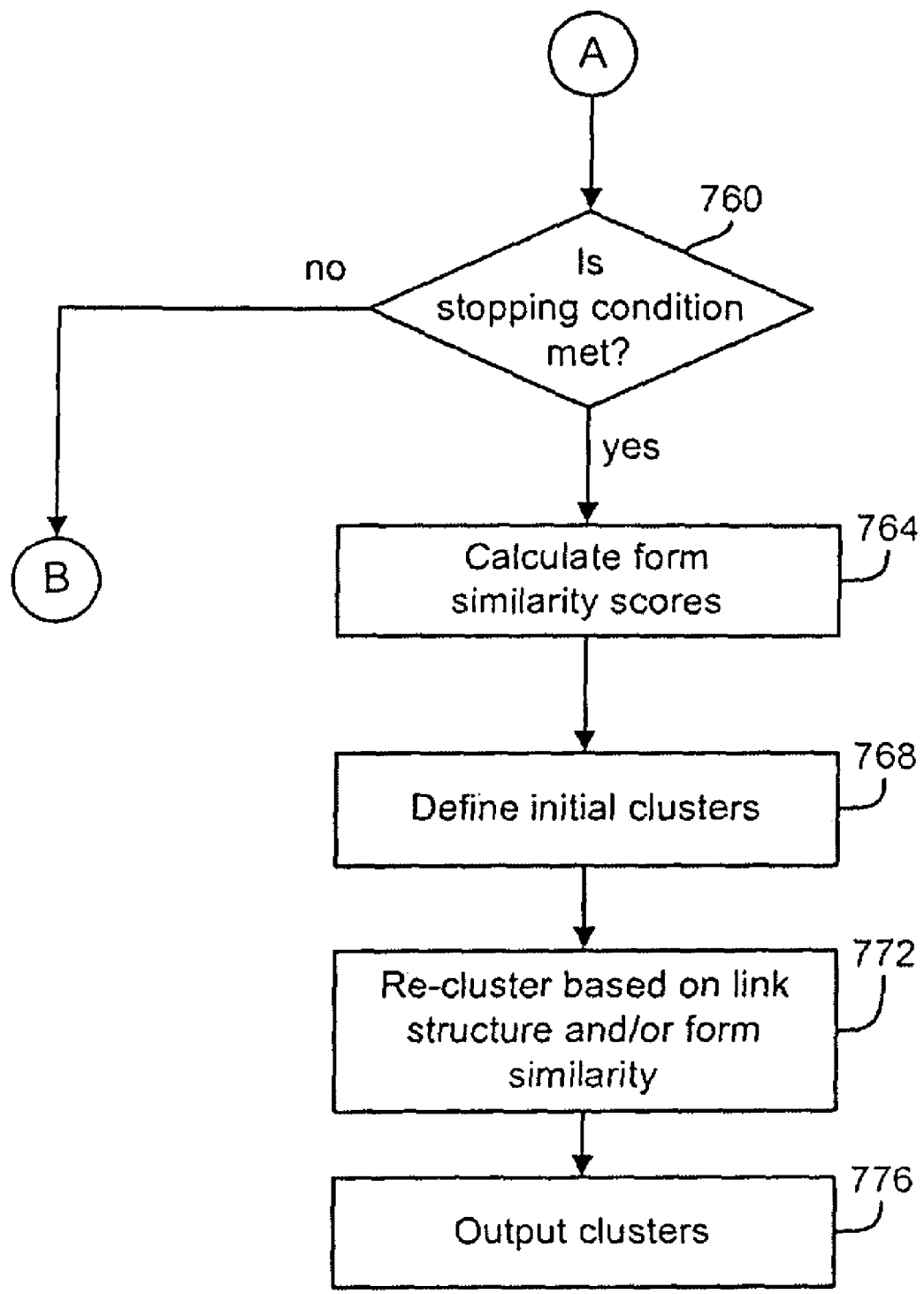

With continuing reference to FIG. 7, in an operation 756, the evaluation scores of the crawl candidates are updated based on the updated link classifier. With reference to FIG. 8, in an operation 760, a determination is made concerning whether or not a stopping condition is satisfied. In an exemplary embodiment, the stopping condition is satisfied when the set of crawl candidates is empty. Additionally or in the alternative, the stopping condition may be satisfied when a specified number of pages have been crawled, when a certain number of relevant forms have been discovered, when adaptive form discovery and clustering application 100 has executed for a specified period of time, when a specified amount of time has passed since identification of a relevant form, etc.

If the stopping condition is not satisfied, processing continues at operation 708. If the stopping condition is satisfied, the relevant forms that have been identified may be clustered. In an alternative embodiment, the relevant forms that have been identified may not be clustered. Because the content of forms that give access to databases/Web applications are often closely tied to the content of the databases and/or to the functionality of the Web application, the clusters of forms implicitly represent clusters of the databases/Web applications themselves. In an exemplary embodiment, the clustering process is decoupled from the relevant form identification process. Thus, any set of forms (and implicitly, the databases/ Web applications they access) can be clustered, not just those obtained using one or more of the operations described with reference to FIGS. 7 and 8.

In an operation 764, a similarity metric quantifying a similarity between pairs of forms is calculated. For example, with reference to FIG. 11, exemplary operations associated with calculating the similarity metric are described. Additional, fewer, or different operations may be performed, depending on the embodiment. The order of presentation of the operations is not intended to be limiting. In an operation 1104, form features associated with the relevant forms are identified. The form features are associated with parts of the documents that are most closely related to the form's database-access/Web application functionality. In a web page, for example, the parts of the documents most closely related to the form's database-access/Web application functionality may be everything between "FORM" tags in the HTML markup of the document. In an operation 1108, document features associated with the documents that contain the relevant forms are identified. The document features are associated with parts of the documents that may or may not be closely related to the database or Web application access functionality. In a webpage, for example, the parts of the documents that may or may not be closely related to the database or Web application access functionality may include everything between "HTML" tags in the HTML markup of the document. Features may be identified as form features and/or as document features using other methods as known to a person of skill in the art. In an exemplary embodiment, the document features and the form features may be identified by eliminating formatting code (such as HTML markup), by stemming the words, and/or by dropping stop words.

In an operation 1112, weights are assigned to the form features and to the document features identified from each relevant form. In an exemplary embodiment, a term frequency/inverse document frequency (TF/IDF) method may be used to calculate and assign the weights $w_i^{j,k}$. Using TF/IDF, each feature i in feature space k of document j is assigned a weight according to equation (1):

$$w_i^{j,k} = TF_i^{j,k} * \log(N^k/n_i^k) \quad (1)$$

where $TF_i^{j,k}$ is the frequency of term i in feature space k of document j, as it is used in vector-space model, N is the total number of documents in feature space k, and $n_i$ is the document frequency in feature space k, i.e., the number of documents in the collection where term i appears in feature space k. Using TF/IDF, the highest weight is assigned to features that occur frequently in the part of document j that is associated with feature space k and that occur infrequently in equivalent parts of other documents. Such features are likely to encode essential distinguishing features of those parts of document j. A modified TF/IDF weighting scheme may be used in which the weights $w_i^{j,k}$ are further multiplied by additional location terms $LOC_i^k$, which weight features according to the location of term i in feature space k. For example, if the documents are webpages, features that occur frequently within "OPTION" tags of the HTML markup may be given a lower weight in the form feature space.

In an operation 1116, a form-similarity score is calculated to determine a similarity between two documents based on the form features and weights associated therewith. In an exemplary embodiment, the form-similarity score is calculated using a cosine similarity metric by treating the form features as vectors whose components are the features and whose values are the weights calculated in operation 1112. The cosine of the angle between the vectors provides the required measure of similarity. Other methods for calculating the form-similarity score may be used as known to a person of skill in the art.

In an operation 1120, a document-similarity score is calculated to determine a similarity between two documents based on the document features and weights associated therewith. In an exemplary embodiment, the document-similarity score is calculated using a cosine similarity metric by treating the document features as vectors whose components are the features and whose values are the weights calculated in operation 1112. The cosine of the angle between the vectors provides the required measure of similarity. Other methods for calculating the document-similarity score may be used as known to a person of skill in the art.

In an operation 1124, the document-similarity score and the form-similarity score are combined into a single similarity score. For example, the document-similarity score and the form-similarity score may be combined using a weighted average of the two similarity scores. In an exemplary embodiment, the form-similarity score is assigned a weight α, and the document-similarity score is assigned a weight β. The combined similarity between two documents is obtained based on equation (2):

$$\text{similarity}(FP_1, FP_2) = \frac{\beta * \cos(\vec{P}C_1, \vec{P}C_2) + \alpha * \cos(\vec{F}C_1, \vec{F}C_2)}{\beta + \alpha} \quad (2)$$

where $\vec{P}C_1$, $\vec{P}C_2$ are the vectors of a first document and a second document in document-feature space and $\vec{F}C_1$, $\vec{F}C_2$ are the vectors of the first document and the second document in form-feature space.

A similarity between two sets of forms or between a form and a set of forms also can be computed using the operations of 1104-1124. To do so, the set of forms is treated as if the set of forms is a single form lying at the centroid of the set. The centroid of a finite set of vectors is the component-wise arithmetic mean of all the vectors in the set.

With reference again to FIG. 8, in an operation 768, an initial set of clusters is defined. A number of clusters in which to cluster the identified relevant forms may be selected by the user. Clustering methods that do not require a pre-defined number of clusters includes hierarchical algorithms such as agglomerative hierarchical clustering, divisive hierarchical clustering, balanced iterative reducing and clustering using hierarchies, and clustering using representatives; density-based methods algorithms such as density-based clustering method based on connected regions with sufficiently high density and ordering points to identify the clustering structure; grid-based methods such as statistical information grid and clustering using wavelet transformation.

In an exemplary embodiment, a document of the relevant forms is assigned randomly to each cluster. As another example, the initial set of clusters may be defined based on the link-structure near the forms and/or the similarity scores calculated in operation 764. For example, with reference to FIG. 12, exemplary operations associated with defining an initial set of clusters are described. Additional, fewer, or different operations may be performed, depending on the embodiment. The order of presentation of the operations is not intended to be limiting. In an operation 1204, "hubs" are identified which link to multiple relevant forms. A hub refers to a document that points to two or more of the relevant forms being clustered. If the Internet or a part of it is being crawled, a hub may be identified by a backward crawl from the relevant forms being clustered to identify a document from which multiple relevant forms can be reached either directly or indirectly.

In an operation 1208, hubs that are unlikely to correspond to meaningful clusters of forms are removed. For example, hubs that point to only a few forms may be removed. As another example, if the Internet or a part of it is being crawled, hubs that link only to forms included or accessed from the same site may be removed. In an operation 1212, points are assigned to the feature spaces of the remaining hubs. For example, the feature spaces may be the same as those used in computing the similarity score of operation 764. Examples are the form- and document-feature spaces. In an exemplary embodiment, the points assigned to each hub in each feature space is the centroid in that space of all the relevant forms to which the hub points.

In an operation 1216, a similarity score between each pair of hubs is calculated, for example, using the similarity score of operation 764. In an operation 1220, the least similar pair of hubs is added to the initial set of clusters based on a comparison of the calculated similarity scores between each pair of hubs. In an operation 1224, a determination is made to determine if a number of clusters of the initial set of clusters equals the number of clusters selected by the user. If the number of clusters of the initial set of clusters does not equal the number of clusters selected by the user, processing continues at an operation 1226. If the number of clusters of the initial set of clusters equals the number of clusters selected by the user, processing continues at an operation 772 of FIG. 8. In operation 1226, a similarity score is calculated between each of the remaining hubs and each member of the initial set of clusters. In an operation 1228, the least similar hub is added to the initial set of clusters based on the calculated similarity score. Processing continues at operation 1224.

With reference again to FIG. 8, in operation 772, the initial set of clusters is reclustered. The reclustering process may be accomplished using a variety of methods as known to a person of skill in the art. For example, the similarity score calculated in operation 764 and a "k means clustering" algorithm can be used to recluster the initial set of clusters where k is a selected number of clusters in which to cluster the relevant forms. k may be the same or different from the number of clusters in which to cluster the identified relevant forms defined in operation 768. Additionally, reclustering methods that do not require a pre-defined number of clusters may be used. Each cluster has an associated centroid vector in each feature space that is used to represent the cluster. The centroid vector of a cluster C is computed by taking an average of the weights of the terms of the relevant documents assigned to cluster C based on equation (3):

$$\vec{c} = \left( \frac{\sum_{\vec{P}C \in C} \vec{P}C}{|C|}, \frac{\sum_{\vec{F}C \in C} \vec{F}C}{|C|} \right) \quad (3)$$

The distance between clusters, as well as between a relevant document containing a relevant form and a cluster can be calculated using Equation 2. The algorithm iterates over the remaining relevant documents, assigning each relevant document to the cluster whose centroid is most similar. The cluster centroids are recomputed. The iteration process may be repeated until the clusters become stable which in an exemplary embodiment is determine if fewer than 10% of the relevant documents are assigned to a different cluster.

Thus, in an exemplary embodiment, a first centroid vector is calculated in a first feature space (i.e., document-feature space) for a cluster C selected from the initialized clusters based on the relevant documents assigned to the cluster C. A second centroid vector is calculated in a second feature space (i.e., form-feature space) for the cluster C based on a form in the relevant documents assigned to the cluster C. A first similarity value (i.e., cosine distance) between a first vector and the first centroid vector is calculated where the first vector is calculated in the first feature space for a relevant document. A second similarity value (i.e., cosine distance) between a second vector and the second centroid vector is calculated where the second vector is calculated in the second feature space based the identified first form. A similarity value between the relevant document and the cluster C is calculated based on the calculated first similarity value and the calculated second similarity value, for example, using equation (2). The process is repeated for each of the initialized clusters to assign the relevant document to the closest cluster based on the calculated similarity value for each of the plurality of clusters. The process is repeated to assign each relevant document to the closest cluster based on the calculated similarity value for each of the plurality of clusters.

Another reclustering algorithm that may be parameterized using a similarity score is the hierarchical agglomerative clustering algorithm (HAC). HAC repeatedly merges the two most similar clusters (according to the similarity score) until a stopping condition is met. Other reclustering methods may be used to recluster the initial set of clusters.

In an operation 776, the clusters of relevant forms are output. The clusters of relevant forms may be output by printing information associated with the clusters, displaying information associated with the clusters, and/or storing information associated with the clusters in computer-readable medium 104 or second database 108. The stored information may be accessed by another application. Other output methods may be used as known to a person of skill in the art.

With continuing reference to FIG. 2, crawler 204 may encapsulate some or all of operations 704-712 and 760. Filter 208 may encapsulate some or all of operations 716-740. Learner 212 may encapsulate some or all of operations 744-756. Clustering module 216 may encapsulate some or all of operations 764-776.

Figure 3:
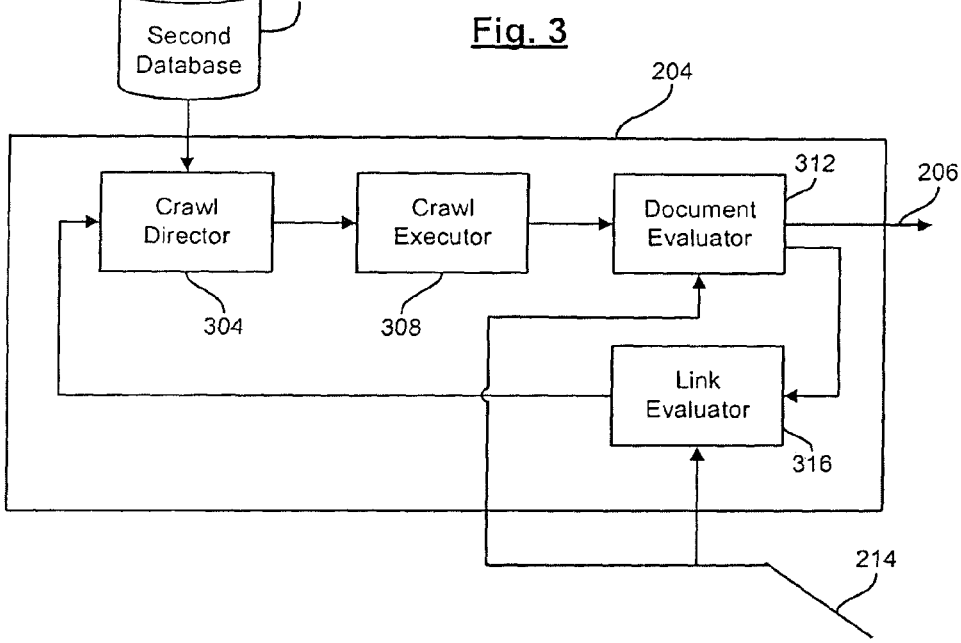
FIG. 3 depicts a block diagram of a crawler module in accordance with an exemplary embodiment.

With reference to FIG. 3, crawler 204 is shown in accordance with an exemplary embodiment. A crawl director 304 accesses initial crawl candidates which may be stored in second database 108. Crawl director 304 controls the direction of the crawl by selecting a next crawl candidate from among the crawl candidates for successive steps of the crawl. The next crawl candidate selected is communicated to a crawl executor 308. Crawl executor 308 obtains the document corresponding to the next crawl candidate selected by crawl director 304. The obtained document is evaluated by a document evaluator 312, which determines whether the obtained document is related to a topic that is relevant to the crawl. A form type classifier may be used in this evaluation. The form type classifier may be stored in second database 108.

If the obtained document is identified as relevant, it is input to filter 208 using first data interface 206. A link evaluator 316 extracts any links that the relevant document contains and evaluates the extracted links for example using a link classifier. This link classifier may be stored in second database 108. Links are sent to crawl director 304 for possible inclusion in the set of crawl candidates, and they are ranked based on the evaluation by the link classifier. The link classifier may be updated by learner 212. The model updates may be communicated using fourth data interface 214.

Filter 208 is responsible for identifying the presence of a concept in a page, and given a pre-defined concept such as a recipe, a biography, a description of a disease, a searchable form, and a Web page, for determining whether the concept is present in the Web page. Various methods exist for implementing a concept filter including heuristics, machine learning and natural language processing. The choice of implementation is dependent on, the specific concept. An exemplary method includes checking for the presence of pre-defined terms and patterns in the Web page. For example, an effective procedure for identifying recipes is to check for terms such as "ingredients" and "directions" and/or strings that follow patterns such as <number> pound|grams|teaspoon|tablespoon. More complex mechanisms utilize machine-learning based techniques to identify patterns which generally require a large number of features.

Figure 4:
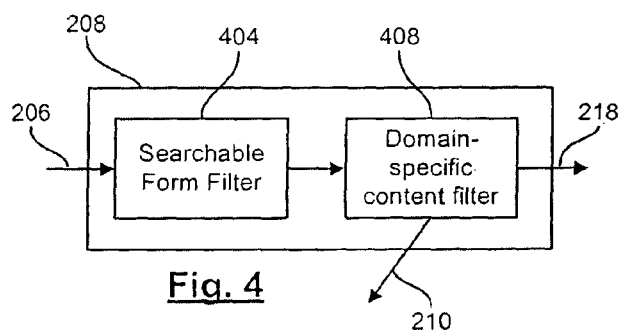
FIG. 4 depicts a block diagram of a filter module in accordance with an exemplary embodiment.

With reference to FIG. 4, filter 208 is shown in accordance with an exemplary embodiment. Filter 208 receives forms from crawler 204 using first data interface 206. Filter 208 filters out non-searchable forms, and identifies searchable forms that are relevant to the subject matter of the crawl. Filter 208 may include a searchable form filter 404 and a domain-specific content filter 408. Searchable form filter 404 filters out non-searchable forms. A form can be classified as searchable or non-searchable. A form is searchable if it returns some information as a response to a user's input. Searchable forms include, for example, forms that serve as a search interface for an online database or document collection (e.g., forms to search for books in online bookstore) as well as forms that provide access to a Web application or service (e.g., a form which given the name of a molecule returns a 3-dimensional image of the molecule). Non-searchable forms include forms whose main role is to submit information (e.g., forms for login, mailing list subscriptions, and Web-based email forms) and which do not return any significant information. For example, non-searchable forms may return an acknowledgement, but no significant information in response to a submission of information by a user.

In another exemplary embodiment, filter 208 may not include searchable form filter 404 and may not include some or all of operations 732, 736, 740, and/or 744 of FIGS. 7 and 8. Additionally, reclustering in operation 772 may not be based on form similarity, and a form similarity score may not be calculated in operation 764 of FIGS. 7 and 8.

A domain-specific content filter 408, which operates on the remaining documents, filters out the documents that do not access relevant databases/Web applications. The set of documents that remain may be input to clustering module 216 using third data interface 218. Learner 212 may also be provided with the set of relevant forms using second data interface 210.

Figure 5:
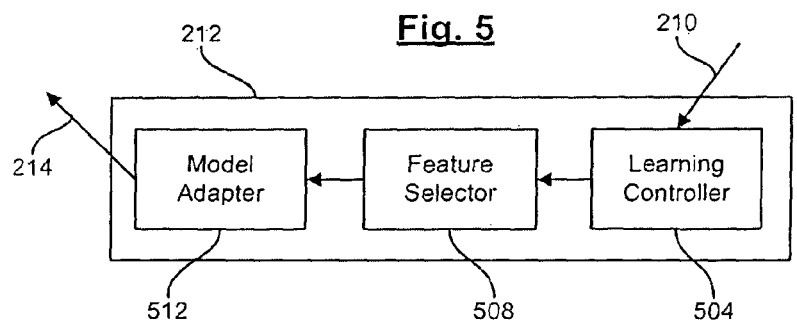
FIG. 5 depicts a block diagram of a learner module in accordance with an exemplary embodiment.

With reference to FIG. 5, learner 212 is shown in accordance with an exemplary embodiment. Learner 212 adapts the link classifiers. Learner 212 receives information about newly-identified relevant documents. A learning controller 504 encapsulates the operations that determine whether a new model-adaptation execution should be triggered. If so, learning controller 504 communicates with a feature selector 508. Feature selector 508 identifies features which serve as the basis for the adapted link classifier of crawler 204. A model adapter 512 uses the identified features to construct adapted link classifiers. The adapted models are input to crawler 204 using fourth data interface 214.

Figure 6A:
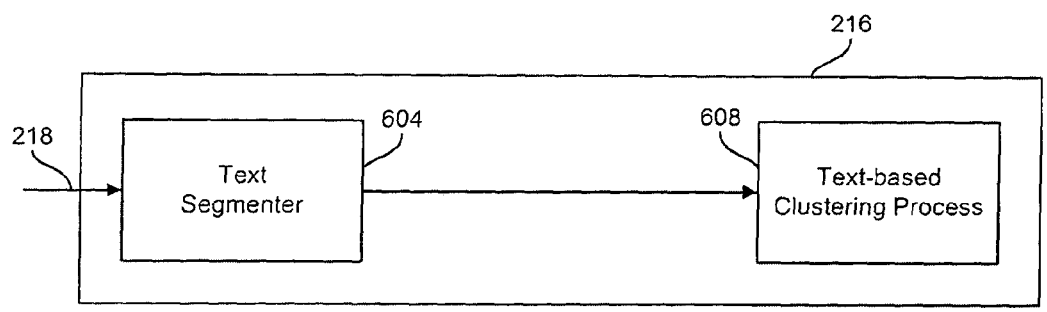
FIGS. 6A and 6B depict block diagrams of exemplary embodiments of a clustering module.
Figure 6B:
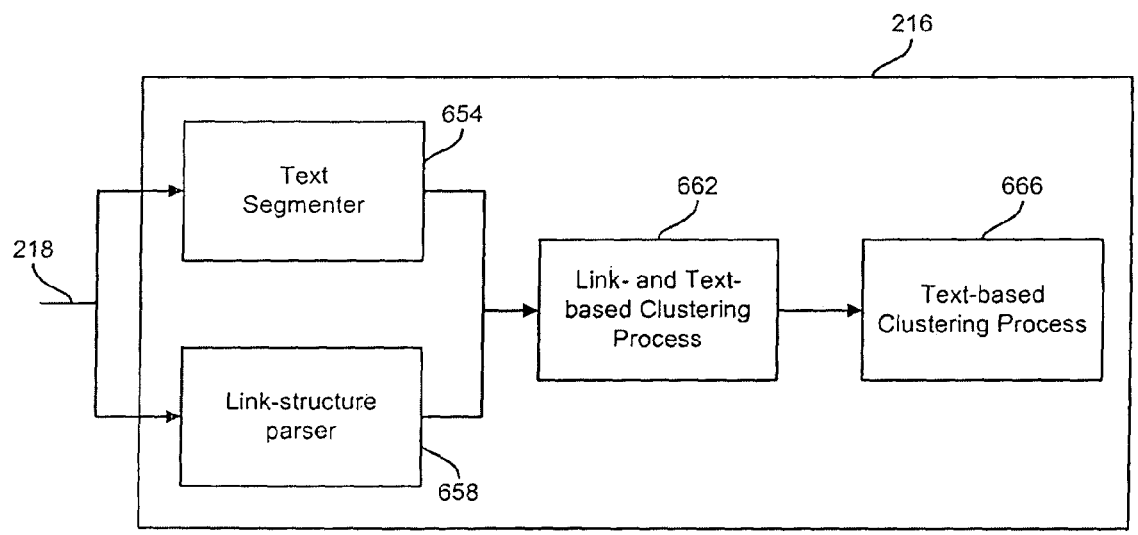

With reference to FIG. 6A, clustering module 216 is shown in accordance with a first exemplary embodiment. Information about relevant forms is input to a text segmenter 604 using third data interface 218. Text segmenter 604 extracts textual features from the relevant forms. A text-based clustering process 608 clusters the relevant forms and outputs the resulting clusters.

With reference to FIG. 6A, clustering module 216 is shown in accordance with a second exemplary embodiment. Information about relevant forms is input to both a text segmenter 654 and a link-structure parser 658 using third data interface 218. Text segmenter 654 extracts textual features from the relevant forms. Link-structure parser 658 extracts link features from links in the vicinity of the relevant forms. A link- and text-based clustering process 662 clusters the forms. The resulting clusters are refined using a second text-based clustering process 666. The resulting clusters are output. Learner 212 may also be provided with the s resulting clusters using fifth data interface 220.

The word "exemplary" is used herein to mean serving as an example, example, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments.

The foregoing description of exemplary embodiments of the invention has been presented for purposes of illustration and of description. It is not intended to be exhaustive or to limit the invention to the precise form disclosed; modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:
1. A device for organizing a plurality of documents that include forms, the device comprising:
   a processor;
   a non-transitory computer-readable medium operably coupled to the processor, the computer-readable medium comprising instructions that, upon execution by the processor, perform operations comprising
   (a) identifying a first form in a first document selected from a plurality of documents;
   (b) calculating a first similarity value in a first feature space between a first cluster selected from a plurality of clusters defined for the plurality of documents and the first document, the first feature space associated with a content of the first document and a content of a document assigned to the first cluster;
   (c) calculating a second similarity value in a second feature space between the first cluster and the first document, the second feature space associated with a content of the identified first form and a content of a form in the document assigned to the first cluster;

(d) calculating a similarity value between the first document and the first cluster based on the calculated first similarity value and the calculated second similarity value;

(e) repeating (b)-(d) with each of the plurality of clusters as the first cluster selected from the plurality of clusters;

(f) determining a cluster of the plurality of clusters to which to assign the first document based on the calculated similarity value for each of the plurality of clusters; and repeat (a)-(f) for each of the plurality of documents as the first document selected from the plurality of documents until the assignments become stable, wherein determining if the assignments become stable includes calculating a number of documents of the plurality of documents that are assigned to a different cluster in (f).

2. A non-transitory computer-readable medium comprising computer-readable instructions therein that, upon execution by a processor, cause the processor to organize a plurality of documents that include forms, the instructions configured to cause a computing device to:

(a) identify a first form in a first document selected from a plurality of documents;

(b) calculate a first similarity value in a first feature space between a first cluster selected from a plurality of clusters defined for the plurality of documents and the first document, the first feature space associated with a content of the first document and a content of a document assigned to the first cluster;

(c) calculate a second similarity value in a second feature space between the first cluster and the first document, the second feature space associated with a content of the identified first form and a content of a form in the document assigned to the first cluster;

(d) calculate a similarity value between the first document and the first cluster based on the calculated first similarity value and the calculated second similarity value;

(e) repeat (b)-(d) with each of the plurality of clusters as the first cluster selected from the plurality of clusters;

(f) determine a cluster of the plurality of clusters to which to assign the first document based on the calculated similarity value for each of the plurality of clusters; and repeat (a)-(f) for each of the plurality of documents as the first document selected from the plurality of documents until the assignments become stable, wherein determining if the assignments become stable includes calculating a number of documents of the plurality of documents that are assigned to a different cluster in (f).

3. A method of organizing a plurality of documents that include forms, the method comprising:

(a) identifying, by a computing device, a first form in a first document selected from a plurality of documents;

(b) calculating, by the computing device, a first similarity value in a first feature space between a first cluster selected from a plurality of clusters defined for the plurality of documents and the first document, the first feature space associated with a content of the first document and a content of a document assigned to the first cluster;

(c) calculating, by the computing device, a second similarity value in a second feature space between the first cluster and the first document, the second feature space associated with a content of the identified first form and a content of a form in the document assigned to the first cluster;

(d) calculating, by the computing device, a similarity value between the first document and the first cluster based on the calculated first similarity value and the calculated second similarity value;

(e) repeating (b)-(d), by the computing device, with each of the plurality of clusters as the first cluster selected from the plurality of clusters;

(f) determining, by the computing device, a cluster of the plurality of clusters to which to assign the first document based on the calculated similarity value for each of the plurality of clusters; and repeating (a)-(f) for each of the plurality of documents as the first document selected from the plurality of documents until the assignments become stable, wherein determining if the assignments become stable includes calculating a number of documents of the plurality of documents that are assigned to a different cluster in (f).

4. The method of claim 3, wherein identifying the first form comprises selecting text between markup language tags used to partition the first document.

5. The method of claim 3, further comprising organizing the plurality of documents by assigning the plurality of documents to the plurality of clusters based on repeating (a)-(f) with each of the plurality of documents as the first document selected from the plurality of documents.

6. The method of claim 5, further comprising outputting the organized documents wherein outputting comprises at least one of printing the assignments, displaying the assignments, and storing the assignments in a memory for use as an input to an application.

7. The method of claim 3, wherein the plurality of documents are identified as documents containing a searchable form.

8. The method of claim 3, wherein the plurality of documents are identified from a search of a plurality of computers connected in a network.

9. The method of claim 8, wherein the network is the Internet.

10. The method of claim 3, wherein calculating the first similarity value comprises:

calculating a first value in the first feature space for the first cluster based on the document assigned to the first cluster; and calculating the first similarity value based on a third value and the calculated first value, the third value calculated in the first feature space for the first document.

11. The method of claim 10, wherein the first value for the first cluster comprises a first centroid vector defined for the document assigned to the first cluster.

12. The method of claim 11, wherein the first centroid vector is defined as a first average of weights of terms identified from the document assigned to the first cluster.

13. The method of claim 12, wherein the first similarity value comprises a first distance calculated between the first centroid vector and the first vector.

14. The method of claim 13, wherein the third value comprises a first vector including first weights calculated for a first plurality of terms identified from the first document.

15. The method of claim 14, wherein the first distance is calculated as a cosine distance between the first centroid vector and the first vector.

16. The method of claim 3, wherein calculating the second similarity value comprises:

calculating a second value in the second feature space for the first cluster based on the form in the document assigned to the first cluster; and calculating the second similarity value based on a fourth value and the calculated second value, the fourth value calculated in the second feature space for the identified first form.

17. The method of claim 16, wherein the second value for the first cluster comprises a second centroid vector defined for the form identified in the document assigned to the first cluster.

18. The method of claim 17, wherein the second centroid vector is calculated as a second average of weights of terms identified from the form identified in the document assigned to the first cluster.

19. The method of claim 18, wherein the fourth value comprises a second vector including second weights calculated for a second plurality of terms identified from the first form.

20. The method of claim 19, wherein the second similarity value comprises a second distance calculated between the second centroid vector and the second vector.

21. The method of claim 3, wherein the similarity value is a sum of the first similarity value and the second similarity value.

22. The method of claim 21, wherein the similarity value is a weighted sum of the first similarity value and the second similarity value.

23. The method of claim 3, wherein determining if the assignments become stable further includes calculating a ratio of the number of documents assigned to a different cluster relative to a second number of the plurality of documents.

24. The method of claim 3, further comprising, before (a), randomly assigning an initial document of the plurality of documents to each of the plurality of clusters.

25. The method of claim 3, further comprising assigning an initial document to each of the plurality of clusters based on a location of the initial document.

26. The method of claim 25, wherein assigning the initial document to each of the plurality of clusters based on the location of the initial document comprises:
(g) identifying a plurality of hubs for the plurality of documents, wherein a hub of the plurality of hubs is associated with a document from which a plurality of the plurality of documents can be reached either directly or indirectly;
(h) identifying a plurality of hub clusters based on the identified plurality of hubs;
(i) calculating a plurality of similarity values, wherein a hub similarity value of the plurality of similarity values indicates a similarity between a pair of the identified plurality of hub clusters;
(j) identifying a first hub cluster and a second hub cluster from the identified plurality of hub clusters based on the calculated plurality of similarity values, wherein the first hub cluster and the second hub cluster are least similar; and
(k) adding the identified first hub cluster and the identified second hub cluster as clusters to the plurality of clusters.

27. The method of claim 26, further comprising:
(l) calculating a second plurality of similarity values between each remaining hub cluster of the identified plurality of hub clusters and the plurality of clusters;
(m) identifying a third hub cluster from the remaining hub clusters based on the calculated second plurality of similarity values, wherein the third hub cluster is least similar to the plurality of clusters;
(n) adding the identified third hub cluster as a cluster to the plurality of clusters; and
(o) repeating (l)-(n) until a stop condition is satisfied.

28. The method of claim 27, further comprising receiving a value representing a desired number of clusters.

29. The method of claim 28, wherein the stop condition comprises a comparison between a cluster count identifying the number of the plurality of clusters and the received value.

30. The method of claim 3, wherein the first feature space includes information associated with a link of the first document.

31. The method of claim 3, wherein the second feature space includes information associated with a link of the identified first form.

32. The method of claim 3, wherein the cluster is determined using a clustering algorithm selected from the group consisting of a k-means clustering algorithm, an agglomerative hierarchical clustering algorithm, a divisive hierarchical clustering algorithm, a balanced iterative reducing and clustering using hierarchies clustering algorithm, a clustering using representatives clustering algorithm, a density-based clustering algorithm, and a grid-based clustering algorithm.

* * * * *